United States Patent [19]

Caroon

[11] Patent Number: 4,633,547
[45] Date of Patent: Jan. 6, 1987

[54] CRAB PICKING MACHINE
[75] Inventor: Linald R. Caroon, Lowland, N.C.
[73] Assignee: Caroon Brothers Seafood, Lowland, N.C.
[21] Appl. No.: 724,184
[22] Filed: Apr. 17, 1985
[51] Int. Cl.⁴ ............................................. A22C 29/00
[52] U.S. Cl. .............................................. 17/71; 17/46
[58] Field of Search ............... 17/46, 48, 53, 58, 61, 17/71; 83/409.1, 586

[56] References Cited
U.S. PATENT DOCUMENTS

| | | |
|---|---|---|
| 2,322,831 | 6/1943 | Danielsson ............................... 17/58 |
| 3,114,403 | 12/1963 | Rianda ............................ 83/409.1 X |
| 3,251,091 | 5/1966 | Altman . |
| 3,253,299 | 5/1966 | Harris . |
| 3,302,236 | 2/1967 | Harris . |
| 3,370,319 | 2/1968 | Houghton et al. . |
| 3,495,293 | 2/1970 | Tolley . |
| 3,596,310 | 8/1971 | Tolley . |
| 3,611,478 | 10/1971 | Lockerby ................................ 17/71 |
| 3,921,256 | 11/1975 | Huebotter ............................ 17/71 |
| 4,073,041 | 2/1978 | Davis et al. . |
| 4,293,981 | 10/1981 | Smith . |
| 4,380,094 | 4/1983 | Tolley et al. . |

Primary Examiner—Willie G. Abercrombie
Attorney, Agent, or Firm—Brumbaugh, Graves, Donohue & Raymond

[57] ABSTRACT

A crab picking machine comprises a two-part tray that receives a crab carapace up and head end forward with approximately each lengthwise half of the crab supported on each tray part. The tray is conveyed through three main work stations where the claws and carapace are removed, the crab is cut in approximately half lengthwise and from top to bottom and the meat is squeezed out through the open cut of each crab half by a roll.

11 Claims, 6 Drawing Figures

CRAB PICKING MACHINE

FIELD OF THE INVENTION

The present invention relates to a crab picking machine and, in particular, a machine that in a simple and effective manner involving essentially only three operations removes all usable meat from the crab body in large lumps cleanly and rapidly.

BACKGROUND OF THE INVENTION

The commercial processing of hard shell crabs involves first butchering and cleaning the crab, that is, removing the appendages and the carapace and cleaning away the viscera and other organs, and then, second, picking the meat from the crab. Many processors carry out the entire process by hand, and the labor costs unquestionably contribute to the high cost of the end product to the consumer. Various machines are known in the prior art for butchering the crab, but the present inventor is unaware of any machine in the prior art that is effective in carrying out the picking operation, that is, the operation in which the meat is removed from the butchered and cleaned body.

Representative of prior art proposals for machines for butchering crabs are the following U.S. patents:
Harris U.S. Pat. Nos. 3,253,299 and 3,302,236;
Tolley U.S. Pat. Nos. 3,495,293 and 3,596,310;
Tolley et al. U.S. Pat. No. 4,380,094;
Davis et al. U.S. Pat. No. 4,073,041;
Houghton et al. U.S. Pat. No. 3,370,319;

All of the aforementioned patents describe and illustrate machines that are, by and large, very complicated in structure, in that they involve relatively intricate holders for positioning the crab and complicated mechanisms for removing the claws, legs, carapace and viscera. Moreover, the end product produced by the machines proposed in those patents is a relatively clean body, that is, a butchered crab body that still contains the meat. Unquestionably, the clean body is more easily picked, but the final operation, the picking of the crab meat from the butchered and cleaned body is a hand operation.

The only prior art that the present inventor is aware of that proposes a machine for removing the meat from a crab is Altman U.S. Pat. No. 3,251,091. The present inventor is not aware, however, of any commercialization of the mechanism of this patent. The Altman patent, in particular, proposes a machine for "picking" the meat from a butchered and cleaned body by extruding it. According to the Altman patent the body is received in a specially shaped lower mold cavity, and an upper mold is pressed against the crab body, the upper mold being likewise specially shaped Considerable emphasis is placed in the Altman disclosure on the exact shapes of the molds, undoubtedly because the pressure has to be applied in a particular way to get the meat to extrude from the body. In view of the importance of the particular shape it also appears to be important that the size of the mold be suited for a particular size crab. Accordingly, one must envision using a range of mold sizes in a commercial operation and sorting the crabs by size in order to obtain effective use of the concept of the Altman patent.

SUMMARY OF THE INVENTION

There is provided, in accordance with the present invention, a crab picking machine in which crabs are subjected to just three simple primary operations, plus, preferably, a washing step, to extract substantially all of the usable meat in large, commercially valuable lumps. The steps carried out by the machine are, first, removal of the two claws and the carapace, second, cutting the crab in approximately half lengthwise and through the body from top to bottom and, third, squeezing the meat out of each half of the body through the open cut using a squeeze roll.

More particularly, a crab picking machine, according to the present invention, comprises a two part tray adapted to carry a crab with the carapace up and the head end forward with approximately one lengthwise half of the crab supported on one part of the tray and the remaining half supported on the other part. The tray parts are transported through first, second and third work stations. As the tray parts move through the first and second work stations they are held side-by-side. At the first work station are mechanisms for (1) removing the claws and (2) removing the carapace. Following the first work station, the body is washed by water jets. At the second work station a saw cuts the crab in approximately half lengthwise and from top to bottom, thereby leaving each crab half carried by a respective tray part. At the third station is a mechanism that rotates the two tray sections to positions such that the cuts from both crab halves face generally rearwardly, with respect to the direction of movement of each tray section through the third station. A roll at the third station engages each one of the crab halves and squeezes out the meat through the cut as the respective tray part moves through the third station.

In a preferred embodiment of the invention, the tray sections are transported through the work stations by an endless belt, each tray part being rotatably mounted by a pivot mounting on a tray bracket that is affixed to the belt. A holder carried by and moving with the belt is positioned to engage and hold the rear end of the crab at the first station.

A preferred mechanism for removing the claws from the crab comprises a pair of pivotable hammer bars supported by framework of the machine in positions to engage the respective claws of the crab as it moves through the first station. A spring is coupled between the framework and a portion of each bar above the pivot point. The lower end of each bar engages an abutment on the respective tray part so that as the tray parts move through the second station each hammer bar is pivoted by engagement with the abutment, and energy is stored in the spring. As soon as the abutment has pivoted the respective hammer bar to a point at which the abutment can move out from under the hammer bar, the energy stored in the spring is released. The springs forceably pivot the hammer bars into engagement with the respective crab claws and knock them off the crab body.

A suitable device for removing the carapace comprises a wedge plate fastened upright to the framework just above the path of a crab as it moves through the first station. The wedge plate includes a tip that is positioned to engage the underside of the carapace of the crab as it moves into the first station, a bottom edge positioned to hold the crab body down as the crab moves through the first station and an upper edge extending obliquely upwardly and forwardly from the tip, relative to the movement of the crab. The upper surface is a wedge surface that is adapted to pry up the carapace progressively from front to back as the crab moves through the first station while the bottom edge holds the body down. Accordingly, the carapace is ultimately detached from the body and can readily be removed from the machine by suitable means and collected. When the preferred devices for removing the claws and for detaching the carapace are used in combination, the wedge plate not only holds the body down on the tray parts as the carapace is removed during the advance of the crab along the conveyor, but the wedge plate also holds the crab down while the hammer bars knock off the claws.

A preferred device for cutting the crab body in pieces of approximately equal size at the second station is a motor driven circular saw carried by the framework of the machine. As the tray parts move through the second station they are positioned with their edges closest to each other spaced apart, such that the lower part of the blade can be received between them, thereby permitting the saw blade to cut the body cleanly apart.

In a preferred embodiment of the machine, each tray part carries a cam follower, and a cam adjacent the third station of the machine is adapted to engage the respective followers of each tray part, each cam being shaped such as to pivot each tray part about the pivot mounting as it moves through the third station. The arrangement is, preferably, such that each tray part is pivoted out so that it is oriented 90° rotationally from its position as it moves through the first and second stations. Accordingly, the squeeze roll that engages the body and squeezes the meat out through the open cut can be oriented perpendicular to the direction of movement of the bodies on the tray parts. Furthermore, it is preferable, in order to prevent the crab from sliding in the tray and not being accepted through the nip of the roll with the tray, for each squeeze roll to be driven in rotation such that its surface moves in the same direction at substantially the same speed as the tray while the respective half of the crab body moves through the third station.

For a better understanding of the invention reference may be made to the following description of an exemplary embodiment, taken in conjuction with the figures of the accompanying drawings.

DESCRIPTION OF THE EMBODIMENT

Figure 1A:
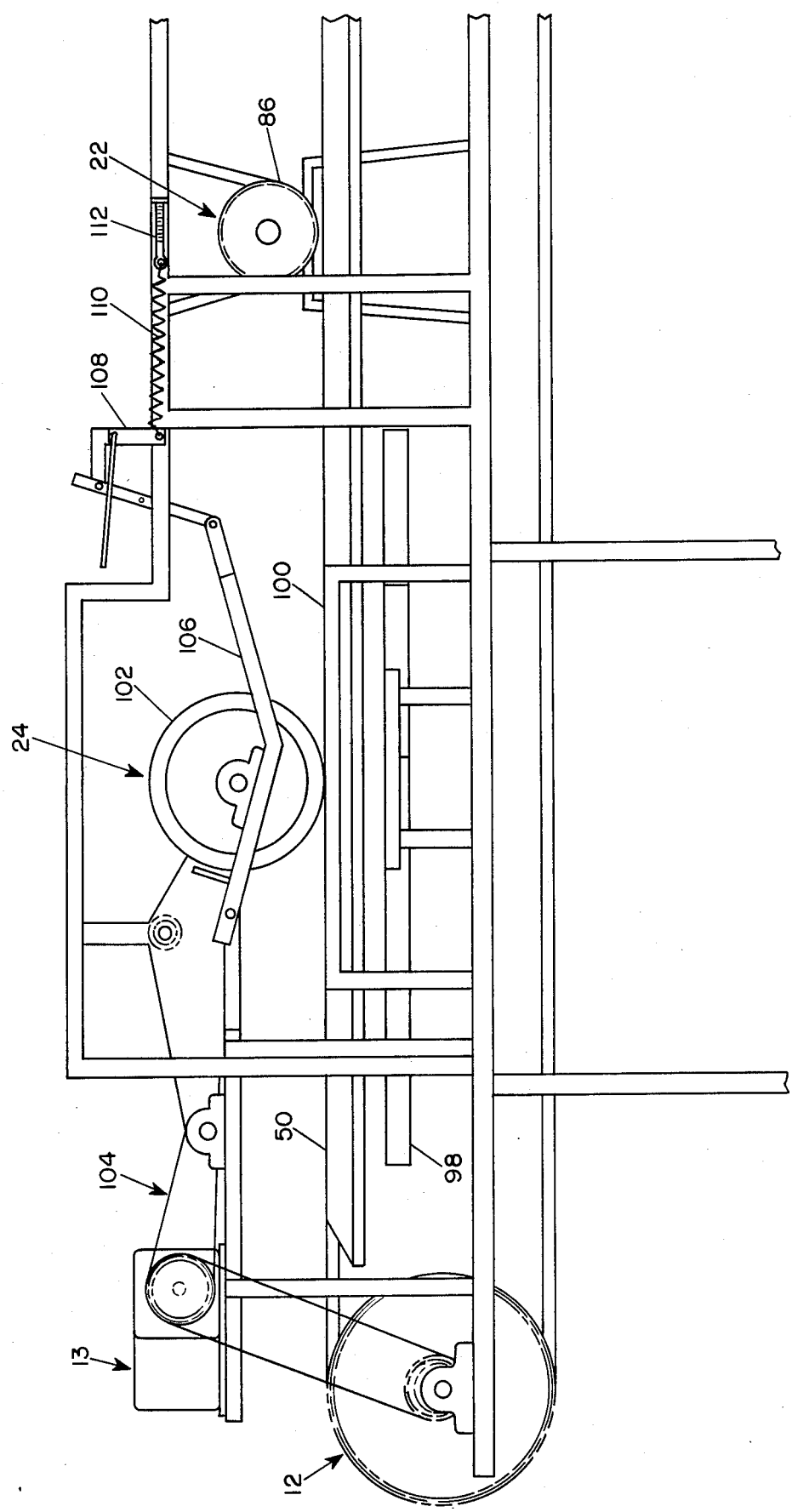
FIG. 1A is a side elevational view in generally schematic form of part of the embodiment.

In the embodiment of the present invention shown in the drawings, crabs are moved through the three main work stations of the machine by a conveyor belt 10, preferably an endless chain link conveyor belt that extends between a sprocket 12 chain driven by a gear reduced motor 13 and an idler sprocket 14 supported in journals carried by a framework 16. The belt 10 carries a suitable number of tray assemblies 18, only one of which is illustrated in the drawings, that are moved by the belt 10 along the upper run from right to left, with respect to FIGS. 1A and 1B. The crabs to be processed in the machine are loaded onto the tray assemblies 18 at the beginning of the upper run of the belt, that is, at approximately the position of the tray assembly 18 shown in FIG. 1B. Each tray assembly of the machine moves sequentially through a first work station 20, where devices described below remove the carapace and the claws, a second work station, where a cutting device cuts the crab in approximately half lengthwise and from top to bottom, and a third work station 24, where the meat is "picked" from the crab body. Between the first and the second work stations water jets are directed from nozzles 26 against the crab body to remove fluids and relatively loose tissues from the crab.

Each tray assembly 18 of the machine consists of a pair of tray parts 28, each of which is mounted by a pivot mounting 30 on a bracket 32 that is fastened by bolts 34 to a specially fabricated link 36 of the conveyor chain belt 10. (The chain belt 10 is represented by phantom lines in FIGS. 2 and 5.) A schematic representation of a crab C is shown in phantom lines in FIG. 2 to depict the general position of the crab on the tray assembly. In particular the crab C rests on the rearward portion of the tray with approximately half of the crab supported on each tray part 28. The crab faces forward in the direction of movement of the tray along the upper run of the conveyor and is impaled right side up on pins 38 projecting up from the upper surface of each tray part 28. The pins 38 assist in holding the crab in position on the tray parts as it moves through the machine.

Figure 2:
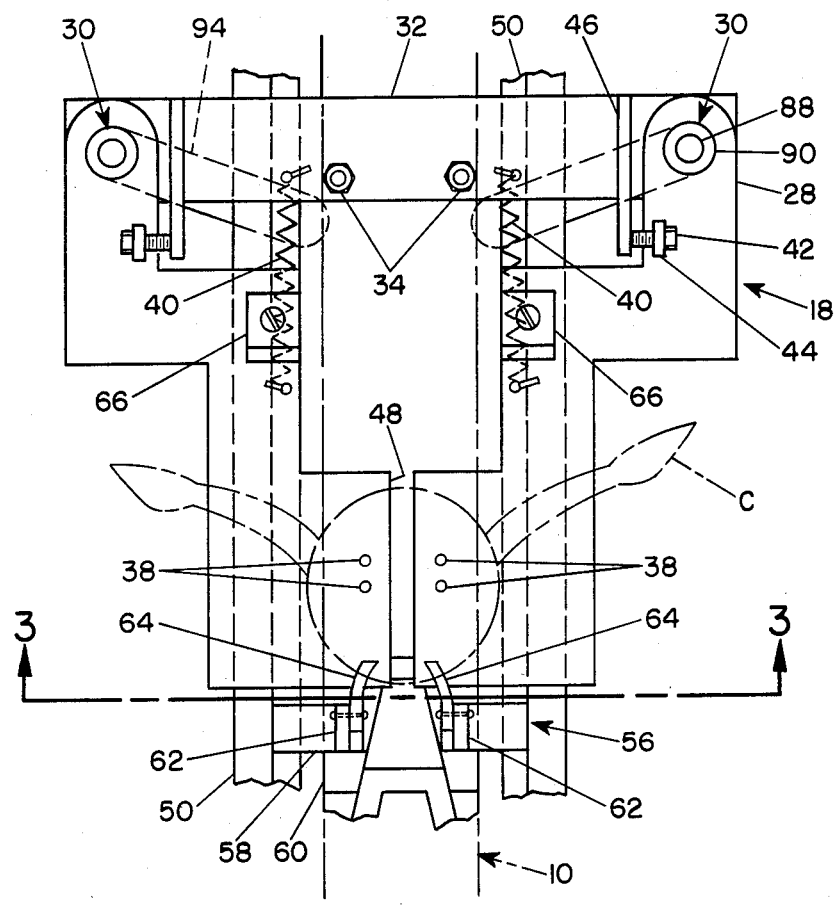
FIG. 2 is a top plan view in schematic form of a tray on which the crabs are transported through the work stations of the machine.
Figure 3:
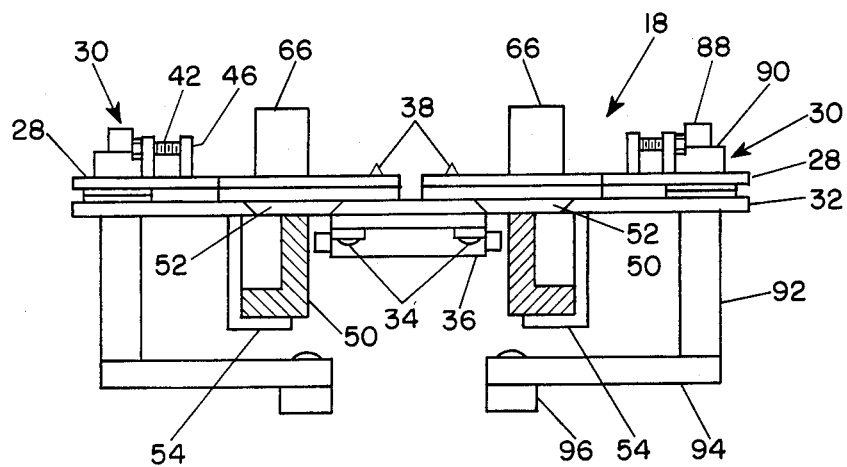
FIG. 3 is a generally schematic end view of the tray taken generally along the plane represented by the line 3—3 in FIG. 2 and in the direction of the arrows.
Figure 4:
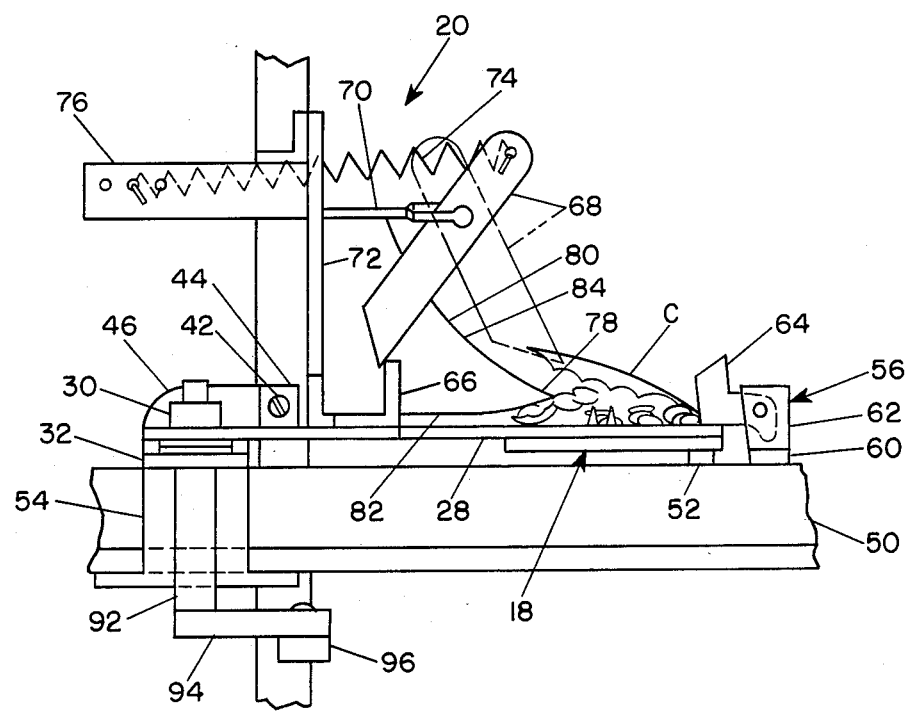
FIG. 4 is a side elevational view in generally schematic form of the first work station of the machine.

As the tray assembly 18 moves through the first and second stations of the machine, each tray part 28 is maintained in the position shown in FIGS. 2 to 4 of the drawings by a spring 40 that is connected under tension between the bracket 32 and the respective tray part 28. In this position, which is established by engagement of a stop bolt 42 threaded through a lug 44 on the tray part with a stop plate 46 on the bracket 32, the portions of the tray parts 28 on which the crab C is carried through the machine are maintained closely adjacent each other, but with a gap 48 between them.

Each of the tray parts 28 is supported by the bracket 32 in cantilevered relation. In addition each tray is supported as it moves through the first and second stations by a pair of guide rails 50 of L-shaped cross-section extending lengthwise on either side of the chain belt 10. One or more slide pads 52 is affixed to the underside of each tray part in a position to ride on the upper edge of the respective guide rail 50. Each slide pad 52 and the upper and lower surfaces of the guide rails 50 are, preferably, coated with an anti-friction material or proviced with a strip of anti-friction material, such as polytetrafluoroethylene ("Telflon"). The bracket 32 also rides along the upper run of the chain belt 10 on the upper edges of the guide rails 50. In addition the bracket 32 carries a pair of generally L-shaped guide members 54, which stabilize the bracket by engaging the bottom surfaces of the respective guide rails 50.

Immediately behind each tray assembly 18 of the machine (with respect to the direction of movement of the tray assemblies) is a holder assembly 56. The holder assembly 56 comprises a transverse bracket member 58 that forms part of a special link 60 of the chain belt, a pair of upstanding lugs 62 and a pair of holder fingers 64, one of which is mounted to pivot on each lug 62. Each finger 64 pivots into the position shown in FIG. 4, in which it engages the back edge of the crab. Each finger 64 can also pivot upwardly to disengage the rearward edge of the tray when the tray assembly moves around in the wheels 12 and 14 and along the lower run of the chain belt. In this respect it will be recalled that the respective tray parts 28 are cantilevered from the pivot mountings 30 on the bracket 32 and that the bracket is fastened to a special link of the chain. Accordingly, as the tray assemblies 18 move around the respective sprockets 12 and 14, their rearward edges will fan out from the chain belt 10 such that the tray parts lie substantially tangent to the perimeter of the sprockets 12 and 14. As the tray moves back onto the upper run, the rearward edge of each tray part engages a portion of each finger and automatically pivots the finger back into position to engage the rear edge of a crab placed on the tray parts (see FIG. 4).

As each tray assembly moves into the first work station 20, an abutment 66 extending up from the top surface of each tray part 28 encounters the lower edge of a corresponding hammer bar 68, there being one such hammer bar 68 corresponding to each tray part. Each hammer bar 68 is pivotally mounted on a supporting yoke 70 that extends out from a bracket 72 affixed to the machine framework. A tension spring 74 is connected between the upper end of each hammer bar 68 and a spring retainer 76 affixed to the framework. As the tray assembly 18 moves through the first station 20, the abutment 66 progressively loads the hammer bar 68 and moves it from the initial unloaded position depicted in phantom lines in FIG. 4 to the nearly fully loaded position illustrated in solid lines in FIG. 4

When the tray assembly moves slightly beyond the point shown in FIG. 4, the abutment 66 rides out from under the lower tip of the hammer bar 66, whereupon the energy stored in the then-tensioned spring 74 pivots the hammer bar around the pivot axis of the supporting yoke 70, thus imparting a sharp hammer blow to the claw of the crab that stands out on the corresponding side of the tray (see FIG. 2). The sharp blow to the claw is sufficient to knock the claw off the crab body. A receptacle (not shown) can be provided to catch the claw as it flung away from the body.

When the tray assembly 18 moves into the first station, the crab C carried on the tray encounters the pointed tip 78 of a wedge plate 80 that is fastened to the bracket 72. The wedge plate 80 lies upright with respect to the surfaces of the tray parts and has a lower edge 82 positioned sufficiently high above the surfaces of the tray parts to allow the body of the crab to pass under but at the same time enabling the lower edge 82 to engage the crab body and hold it down on the tray. The upper edge 84 of the wedge plate 80 lies oblique to the surfaces of the tray parts such that it is inclined forwardly and upwardly relative to the path of the crab along the machine. The tip 78 of the wedge plate engages the front of the crab just under the edge of the carapace. Accordingly, as the crab moves along supported by the tray parts of the tray assembly 18 through the first work station 20, the inclined surface 84 of the wedge plate 80 progressively pries up on the front of the carapace while the lower edge holds the body of the crab down on the tray. Eventually, the carapace is pulled completely loose from the crab body, which leaves the first station 20 with the two claws and the carapace removed. In the course of the removal of the carapace and the claws the holding fingers 64 of the holder assembly 56, together with the pins 38 on which the crab is impaled, keep the crab from being pushed rearwardly when it encounters the wedge plate and when the hammer bars snap forward to knock off the claws. It has been found desirable to have the hammer bars oriented such that they lie oblique to the plane of the surface of the tray parts with an upward and outward incline from bottom to top. Such an inclination of each hammer bar imparts a blow to the claw that includes a laterally outward component that assists in detaching the claw from the body.

As mentioned previously, after the claws and carapace have been removed in the first work station of the machine water jets from the nozzles 26 are directed against the crab to remove body fluids and tissues.

Figure 1B:
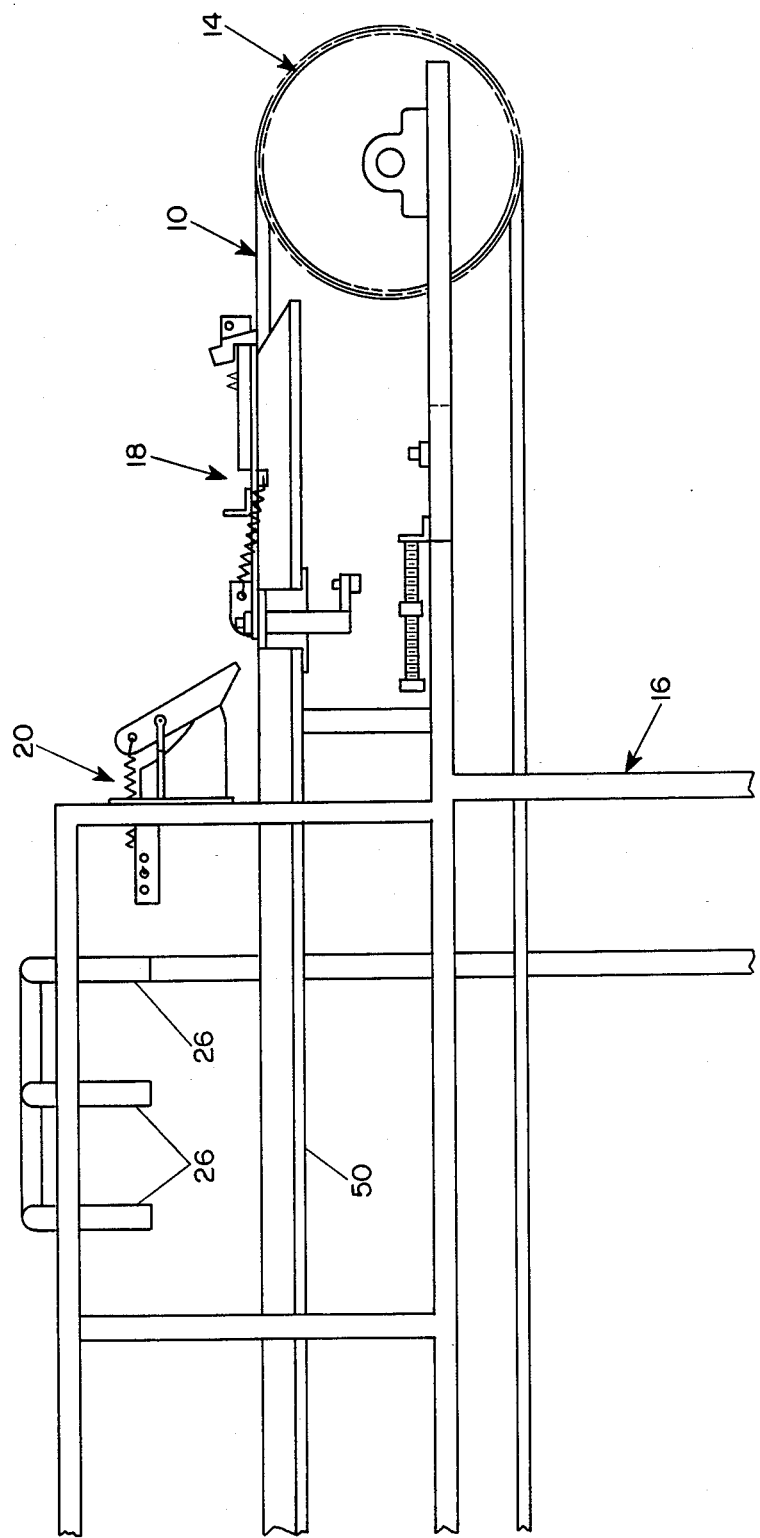
FIG. 1B is a side elevational view in generally schematic form showing the remaining part of the embodiment.

At the second station 22 of the machine a motor driven circular saw blade rotating clockwise, relative to FIG. 1A of the drawings, cuts the crab body in approximately half. The lower part of the saw blade intrudes into the gap between the two tray sections, thereby cutting the crab cleanly in half. The pins upon which the crab body is impaled are adequate to hold the body in position during cutting.

Figure 5:
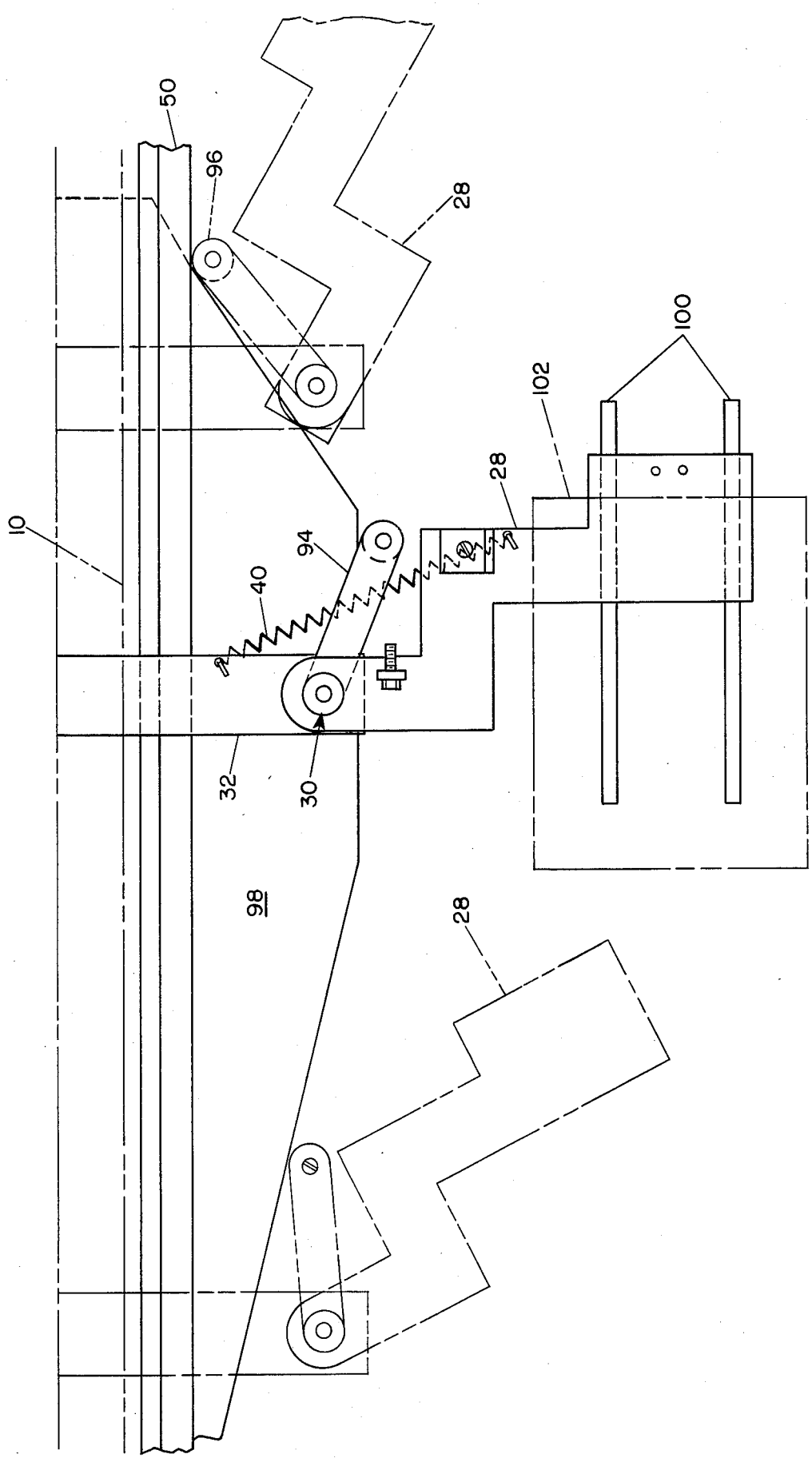
FIG. 5 is a top plan view of one side of the third work station of the machine.

The pivot mounting 30 of each tray part comprises an axle 88 that is affixed to the tray plate by a collar 90 and extends down through the bracket 32 and a sleeve 92 affixed to the underside of the bracket. A cam follower lever arm 94 is affixed to the axle 88 and extends inwardly two the centerline of the machine and carries a rotatable cam follower roll 96 at its inner, free end. Upon approaching the third station 24 of the machine, the cam follower roll 96 encounters a cam plate 98, the outwardly facing edge of which controls the outward deployment of each tray part 28 from the position shown in FIG. 2 into a position, as shown in FIG. 5, in which the tray part has been rotated 90° so that it extends outwardly from each side of the machine. (It is apparent that FIG. 5 shows only one half of the machine, and it will be understood, of course, that a cam plate 98 extends out from the other side of the machine and deploys the other tray part into a position that is the mirror image of position illustrated in FIG. 5.)

In the outwardly deployed position the underside of each tray part 28 rides on a pair of supporting rails 100 that are suitably attached to the machine framework. As the tray part 28 moves longitudinally along the rails 100, the crab half carried by the tray part encounters a rotating squeeze roll 102 (see FIG. 1A and also the phantom lines in FIG. 5). The squeeze roll 102 is driven by a chain drive 104 taken off the motor 13. The drive ratio of the drive 104 is such that the surface of the roll 102 rotates in the clockwise direction, relative to FIG. 1A such that the surface of the roll moves in the same direction and at substantially the same speed as the tray part. The roll 102 is carried by a pivotable supporting frame assembly 106. The squeezing force applied by the roll 22 is provided by a lever 108 loaded by a spring 110, the force of which can be adjusted by an adjusting screw 112. The squeeze roll 102 squeezes the meat out of the crab body through the open cut made by the saw blade 86. The outward deployment of each tray part to a position 90° rotationally from the position assumed when the cut was made at the second work station 22 makes it possible to present the crab half to the squeeze roll in an orientation favorable for squeezing out the meat. The cut of the crab body half is positioned generally coextensively with the rearward edge of the tray part so that as the meat is squeezed from the crab half, it falls off over the back edge of the tray and into a waiting receptacle (not shown) underneath. The remaining carcass parts of the respective crab halves pass out from under the squeeze roll 102 and are carried along by the tray parts which, under the guidance of the cam plate 98 and under the urging of the spring 40, move back from the deployed position into the inward position shown in FIGS. 2 and 3 as the respective tray parts move farther along the machine away from the third work station 24.

As each tray assembly turns around the driven sprocket wheel 12 of the conveyor belt, it also turns upside down. A receptacle (not shown) can be located under the path traversed by each tray as it turns over to catch the carcasses of the crabs. Each tray assembly then moves along the lower run of the conveyor belt and then around the idler sprocket wheel back to the starting position.

The above described embodiment of the invention is intended to be merely exemplary, and numerous variations and modifications of the embodiment will be readily apparent to those skilled in the art without departing from the spirit and scope of the present invention. All such variations and modifications are intended to be included within the scope of the invention, as defined in the appended claims.

I claim:

1. A crab picking machine comprising a two part tray adapted to support a crab with its carapace up and its head forward and with approximately one lengthwise half supported on one tray part and the other lengthwise half supported on the other tray part, transport means for moving the tray through successive first, second and third work stations in the recited order, means for holding the tray parts side by side as the tray moves through the first and second work stations, means at the first work station for removing claws from a crab, means at the first work station for removing the carapace from a crab, means at the second work station for cutting a crab in approximately half lengthwise and from top to bottom, leaving each crab half supported by a respective tray part, means adjacent the third station for rotating both tray parts to positions such that cuts of crab halves formed at said second station face generally rearwardly, with respect to the direction of movement of each tray part through the third station, and a pair of rolls at the third station, each of which is adapted to engage a crab half and squeeze out the meat through a cut formed at said second station as the respective tray parts move through the third station.

2. A crab picking machine according to claim 1 wherein the transport means includes an endless belt, wherein a tray bracket is fastened to the belt and wherein each tray part is rotatably mounted by a pivot mounting on the tray bracket.

3. A crab picking machine according to claim 2 and further comprising a holder carried by the belt and positioned to engage and hold the tail of a crab at the first work station.

4. A crab picking machine according to claim 3 wherein the endless belt runs along an upper run between a driven wheel and an idler wheel carried by the machine framework, and further comprising a pair of guide rails, one on each side of the belt and extending along the upper run of the belt, the tray bracket being slidably supported on the guide rails as the tray parts traverse the upper run of the belt.

5. A crab picking machine according to claim 2 and further comprising a cam follower on each tray part and a cam adjacent the third station adapted to engage the respective follower of each tray part and shaped to pivot each tray part about the pivot mounting thereof as it moves past the third station.

6. A crab picking machine according to claim 5 wherein the pivot mounting of each tray part is adjacent an end thereof that is remote from a portion thereof that receives a crab, whereby pivoting of each tray part also laterally displaces said portion that receives a crab.

7. A crab picking machine according to claim 1 wherein the means for removing the claws of a crab includes a pair of pivotable hammer bars supported at pivot points by framework of the machine in respective positions to engage the respective claws of the crab as it moves through the first station, a spring coupled between the framework and a portion of each bar spaced apart from the pivot point, and an abutment movable conjointly with each tray part and engageable with a respective hammer bar, whereby as the tray moves through the first station, each hammer bar is pivoted by engagement with the abutment to store energy in the spring and is then released as the corresponding abutment moves past the hammer bar and the spring forceably pivots the hammer bar into engagement with the respective crab claw and knocks it off the crab body.

8. A crab picking machine according to claim 1 wherein the means for removing the carapace includes a wedge plate fastened upright to framework of the machine at the first station and having a tip positioned to enter the body of a crab below the front of the carapace as it moves into the first station, a bottom edge positioned to hold the crab body down as the crab moves through the first station and an upper edge extending obliquely upwardly and forwardly from the tip, relative to the movement of the crab, the upper surface being a wedge surface adapted to pry up the carapace progressively from front to back while the bottom edge holds the body down, whereby the carapace is ultimately detached from the body.

9. A crab picking machine according to claim 8 wherein the means for removing the claws of a crab includes a pair of pivotable hammer bars supported at pivot points by framework of the machine in respective positions on either side of the wedge plate to engage the respective claws of the crab while it is held down by the bottom edge of the wedge plate and as it passes through the first station, a spring coupled between the framework and a portion of each bar spaced apart from the pivot point, and an abutment movable with each tray part and engageable with a respective hammer bar, whereby as the tray moves through the first station, each hammer bar is pivoted by engagement with the abutment to store energy in the spring and is then released as the corresponding abutment moves past the hammer bar and the spring forceably pivots the hammer bar into engagement with the respective crab claw and knocks it off the crab body.

10. A crab picking machine according to claim 1 wherein the means for cutting the crab body includes a motor-driven circular saw blade carried by framework of the machine, and wherein the tray parts are positioned at the second station with their edges closest to each other spaced apart such that a part of the blade is received between them, thereby to enable the crab body to be cut cleanly apart.

11. A crab picking machine according to claim 1 wherein each roll is driven in rotation such that the peripheral surface thereof moves in the same direction and at substantially the same velocity as the respective tray part.

* * * * *